(12) United States Patent
Suh et al.

(10) Patent No.: US 8,480,930 B2
(45) Date of Patent: Jul. 9, 2013

(54) CARBON AEROGELS FOR SUPERCAPACITORS AND METHOD OF MANUFACTURING THE SAME

(75) Inventors: Dong Jin Suh, Seoul (KR); Tae Jin Park, Seoul (KR); Young-Woong Suh, Seoul (KR); Young Hyun Yoon, Seoul (KR); Hyun-Joong Kim, Incheon (KR)

(73) Assignee: Korea Institute of Science and Technology (KR)

( * ) Notice: Subject to any disclaimer, the term of this patent is extended or adjusted under 35 U.S.C. 154(b) by 330 days.

(21) Appl. No.: 12/740,606

(22) PCT Filed: Oct. 9, 2008

(86) PCT No.: PCT/KR2008/005939
§ 371 (c)(1),
(2), (4) Date: Apr. 29, 2010

(87) PCT Pub. No.: WO2009/057902
PCT Pub. Date: May 7, 2009

(65) Prior Publication Data
US 2010/0310847 A1 Dec. 9, 2010

(30) Foreign Application Priority Data
Oct. 30, 2007 (KR) .......................... 10-2007-0109399

(51) Int. Cl.
*H01B 1/04* (2006.01)
(52) U.S. Cl.
USPC ........ 252/502; 252/511; 252/519.1; 428/220; 429/53; 502/402; 502/416; 502/418; 516/111; 521/53; 521/97
(58) Field of Classification Search
USPC .... 252/511, 519.1, 502; 429/40, 53; 502/418, 502/402, 416; 521/53, 97; 428/220; 516/111
See application file for complete search history.

(56) References Cited

U.S. PATENT DOCUMENTS 4,873,218 A 10/1989 Pekala
4,997,804 A * 3/1991 Pekala .......................... 502/418
(Continued)

FOREIGN PATENT DOCUMENTS

JP 2006-306639 * 11/2006
JP 2006306639 11/2006
(Continued)

*Primary Examiner* — Khanh Tuan Nguyen
(74) *Attorney, Agent, or Firm* — Jansson Munger McKinley & Shape Ltd.

(57) ABSTRACT

A method for preparing carbon aerogels and carbon aerogels obtained therefrom are disclosed. The method for preparing carbon aerogels comprises: mixing organic starting materials including phloroglucinol and furfural with a solvent capable of dissolving the organic materials in a predetermined ratio to form a sol solution; adjusting pH of the sol solution adequately by using an acidic or basic catalyst, gelling the sol solution at room temperature under atmospheric pressure, and aging the resultant gels; substituting the solvent in thus obtained gels with liquid carbon dioxide, followed by drying in a supercritical state, to form organic aerogels; and pyrolyzing the organic aerogels in an electric furnace under inert atmosphere to obtain carbon aerogels. Particularly, the gels are formed at room temperature in a short period of time by adequately adjusting pH of the sol solution. Therefore, the method provides improved time efficiency and energy efficiency as compared to existing methods for preparing gels. Additionally, the method allows supercritical drying while avoiding a need for an additional solvent substitution, thereby simplifying the overall process. Further, the method enables preparation of carbon aerogels for supercapacitors having a high specific surface area and high capacitance even in the absence of additional activation step.

10 Claims, 1 Drawing Sheet

U.S. PATENT DOCUMENTS

| | | | |
|---|---|---|---|
| 5,260,855 A * | 11/1993 | Kaschmitter et al. | 361/502 |
| 5,744,510 A | 4/1998 | Pekala | |
| 5,962,539 A * | 10/1999 | Perrut et al. | 521/97 |
| 6,005,012 A * | 12/1999 | Hrubesh et al. | 521/53 |
| 6,503,655 B1 * | 1/2003 | Petricevic et al. | 429/530 |
| 6,670,402 B1 * | 12/2003 | Lee et al. | 516/111 |
| 2003/0176277 A1 * | 9/2003 | Suh et al. | 502/180 |
| 2005/0066574 A1 | 3/2005 | Cooper et al. | |
| 2006/0029857 A1 * | 2/2006 | Cherepy et al. | 429/40 |
| 2007/0197744 A1 * | 8/2007 | Schadler et al. | 526/88 |

FOREIGN PATENT DOCUMENTS

| | | |
|---|---|---|
| KR | 1020010017538 A | 5/2001 |
| KR | 1020060131889 A | 12/2006 |

* cited by examiner

ORGANIC STARTING MATERIALS
+ CATALYST
+ SOLVENT

⇓

GELLING
AT ROOM TEMPERATURE
AND AGING

⇓

SUPERCRITICAL DRYING
OF AGED GELS

⇓

HEAT TREATMENT OF
DRIED ORGANIC AEROGELS

⇓

FORMATION OF
CARBON AEROGELS

CARBON AEROGELS FOR SUPERCAPACITORS AND METHOD OF MANUFACTURING THE SAME

FIELD OF THE INVENTION

Example embodiments disclosed herein relate to a method for preparing carbon aerogels for supercapacitors and carbon aerogels obtained therefrom.

BACKGROUND OF THE INVENTION

Carbon aerogels are porous materials with high porosity. Due to their high electrical conductivity and large specific surface area, carbon aerogels may be used in high-performance electrode materials, energy storage devices, harmful substance adsorbents, capacitive deionization-based water purification processes, seawater desalination processes, ion exchange-based waste water treatment processes, and the like. Such carbon aerogels may be obtained from heat treatment of organic aerogels. In general, starting materials for preparing the organic aerogels include resorcinol-formaldehyde, polyacrylonitrile (PAN) and polyurethane (PU). In the case of most existing organic aerogels, an adequate amount of catalyst is added to aqueous solution of the above organic materials, followed by heating, to form the gels for several days to several tens of days or more. Next, the gels obtained from the above method are subjected to supercritical drying, and thus require an additional step of substituting the solvent in the gels with another solvent, such as acetone, suitable for supercritical drying using carbon dioxide. Such an additional step takes several days to several tens of days. Additionally, such existing methods need an additional activation step to obtain high activity.

Therefore, in view of the above problems, provided is a method for preparing carbon aerogels for supercapacitors, wherein organic starting materials are dissolved in an organic solvent, and then pH of the resultant solution is adequately adjusted to form gels at room temperature in a short period of time. The above method provides improved time efficiency and energy efficiency as compared to existing methods for preparing gels. Additionally, the above method allows supercritical drying while avoiding a need for an additional solvent substitution step, thereby simplifying the overall process. Further, the above method enables preparation of carbon aerogels for supercapacitors having a high specific surface area and high capacitance even in the absence of additional activation step.

SUMMARY OF THE INVENTION

In accordance with an aspect of the present invention, provided is a method for preparing carbon aerogels including: mixing a benzene compound containing at least one hydroxyl group with a compound containing an aldehyde group in a predetermined ratio, and dissolving the resultant mixture in a solvent selected from primary alcohol, secondary alcohol, tertiary alcohol, acetone and tetrahydrofuran in a predetermined ratio to form a sol solution. The formed sol solution is gelled at a temperature of 10-80 under atmospheric pressure, and aging the resultant gels; substituting the solvent in thus obtained gels with liquid carbon dioxide, followed by drying in a supercritical state, to form aerogels; and heat treating thus obtained aerogels in an electric furnace under inert atmosphere at a temperature of at least 600 to obtain carbon aerogels. In accordance with another aspect of the invention, a method for preparing carbon aerogels further includes adding an acidic or basic catalyst to the sol solution in a predetermined ratio. In accordance with still another aspect of the invention, there are provided carbon aerogels obtained by the above method and having a specific surface area of 700 $m^2/g$ to 1,200 $m^2/g$ and a capacitance of 200 F/g to 400 F/g.

According to a preferred embodiment, the method for preparing carbon aerogels includes dissolving organic starting materials for preparing organic aerogels in an organic solvent and adequately adjusting pH of the resultant solution to form gels at room temperature in a short period of time. Therefore, the method provides improved time efficiency and energy efficiency as compared to existing methods for preparing gels. Additionally, the method allows supercritical drying while avoiding a need for an additional solvent substitution step by using a solvent easily miscible with carbon dioxide, thereby simplifying the overall process. Further, the method enables preparation of carbon aerogels having a high specific surface area and high capacitance even in the absence of an additional activation step. The carbon aerogels can be applied to various applications, including electrode materials for supercapacitors, electrode materials for seawater desalination and deionization-based water purification, electrode materials for secondary batteries and fuel cells, adsorption and removal of harmful substances using a large specific surface area, catalyst carriers, hydrogen storage materials, and the like.

BRIEF DESCRIPTION OF DRAWINGS

Description will now be made in detail with reference to certain exemplary embodiments illustrated in the accompanying drawing which is given hereinbelow by way of illustration only, wherein:

FIG. 1 is a schematic flow chart illustrating the method for preparing carbon aerogels according to one embodiment.

DETAILED DESCRIPTION OF PREFERRED EMBODIMENTS

Reference will now be made in detail to various embodiments and examples of which are illustrated in the accompanying drawing and described below. While the description will be made in conjunction with exemplary embodiments, it will be understood that the description is not intended to be limiting in any respect.

In the method for preparing carbon aerogels according to a preferred embodiment, various parameters of a sol-gel process, supercritical drying process and heat treatment process of organic aerogels are controlled to obtain carbon aerogels having a high specific surface area and high capacitance. Such parameters include the mixing ratio of the organic starting materials, the ratio between the organic starting materials and the catalyst, and the ratio between the organic starting materials and the solvent. Hereinafter, a method for preparing carbon aerogels for supercapacitors using a sol-gel process and a supercritical drying process according to one preferred embodiment will be discussed in more detail.

The method for preparing carbon aerogels for supercapacitors according to one a preferred embodiment includes: mixing organic starting materials in a predetermined ratio, dissolving the resultant mixture in a solvent in a predetermined ratio, and adding an acidic or basic catalyst thereto in a predetermined ratio to form a sol solution. The sol solution formed is gelled at a temperature of 10-80 under atmospheric pressure, and aging the resultant gels; substituting the solvent in thus obtained gels with liquid carbon dioxide, followed by drying in a supercritical state, to form organic aerogels; and heat treating thus obtained organic aerogels in an electric furnace under inert atmosphere at a temperature of at least 600 to obtain carbon aerogels. FIG. 1 is a schematic flow chart illustrating the method for preparing carbon aerogels according to one preferred embodiment.

First, organic starting materials are mixed with a solvent capable of dissolving the same in a predetermined ratio, and an acidic or basic catalyst is added thereto in a predetermined ratio to form a sol solution. Particularly, the organic starting materials that may be used include a benzene compound (a first organic compound) containing at least one hydroxyl group, for example, phenol, catechol, resorcinol, hydroquinone or phloroglucinol, and a compound containing an aldehyde group (a second organic compound), for example, formaldehyde, acetaldehyde or furfural. Any combinations of the first organic compound with the second organic compounds may be used. More particularly, the first organic compound that may be used includes catechol, resorcinol or phloroglucinol, and the second organic compound that may be used includes formaldehyde or furfural. Especially, the first organic compound and the second organic compound may be phloroglucinol and furfural, respectively, but are not limited thereto. The mixing ratio of the first organic compound $P_1$ to the second organic compound $P_2$, i.e., $P_1/P_2$ may be 1/1, 1/2, 1/3 or 1/4. In particular, $P_1/P_2$ may be 1/2 or 1/3.

There is no particular limitation in the solvent used forming the sol solution, as long as the solvent can dissolve the organic starting materials. However, solvents easily miscible with carbon dioxide, such as alcohol, acetone or tetrahydrofuran, may be more appropriate than solvents hardly miscible with carbon dioxide, such as water or N,N-dimethylformamide (DMF). Particular examples of the solvent that may be used include a primary alcohol such as methanol or ethanol, a secondary alcohol such as isopropanol or isobutanol, or a tertiary alcohol such as tertiary butanol. The ratio between the first organic compound $P_1$ and the solvent S, i.e., P/S may be approximately 1/50, 1/100, 1/150, 1/200, 1/250, 1/300, 1/350, 1/400, 1/450 or 1/500. In particular, $P_1/s$ may be approximately 1/100, 1/150, 1/200, 1/250 or 1/300.

Although any catalysts that can be dissolved in the solvent may be used in forming the sol solution, particular examples of the acidic catalyst include formic acid, acetic acid, phosphoric acid, nitric acid, hydrochloric acid or sulfuric acid, and those of the basic catalyst include amines such as aqueous ammonia, monoethanolamine or triethanolamine, potassium hydroxide, sodium hydroxide, sodium carbonate or the like. The above catalysts may be used alone or in combination. Particularly, the acidic catalyst may be formic acid, acetic acid or nitric acid, and the basic catalyst may be monoethanolamine, triethanolamine, potassium hydroxide or the like. In another embodiment, catalyst may not be used. The ratio of the first organic compound $P_1$ to the catalyst C, i.e., $P_1/C$ may be varied depending on the ratio of the first organic compound to the solvent. $P_1/C$ may be approximately 1/0.1, $P_1/C=1/0.02$, $P_1/C=1/0.01$, $P_1/C=1/0.002$, $P_1/C=1/0.001$, $P_1/C=1/0.0002$ or $P_1/C=1/0.0001$. In particular, $P_1/C$ may be 1/0.02, 1/0.01, 1/0.002 or 1/0.001.

Then, gels are formed by using the obtained sol solution, and the gels are aged and stabilized. The gels are formed under atmospheric pressure at a temperature of approximately 10° C., 20° C., 40° C., 60° C. or 80° C. The gel formation may be carried out at a temperature of approximately 15° C., 20° C., 25° C., 30° C., 35° C. or 40° C. In particular, the gel formation may be carried out at room temperature or at a temperature slightly higher or lower than room temperature, for example, at a temperature of approximately 20° C., 25° C. or 30° C. To stabilize the resultant gels, the gels may be aged for approximately 1 day, 3 days, 5 days or 7 days, particularly, for 3 days or 5 days.

Then, the formed gels are introduced into an autoclave and liquid carbon dioxide is supplied thereto so that the solvent in the gels can be substituted with liquid carbon dioxide. Then, the carbon dioxide present in the gels is removed in a supercritical state to obtain organic aerogels while maintaining the pore structure of the gels as it is. In a variant, the solvent used in the sol-gel process may be removed under its supercritical state to obtain organic aerogels.

Then, thus obtained organic aerogels are heat treated in an electric furnace under inert atmosphere to convert them into carbon aerogels. At this time, any inert gas that does not adversely affect the organic aerogels during the heat treatment may be used, but particular examples of the inert gas include, but is not limited to, helium, nitrogen or argon, particularly, helium or argon. The heat treatment for preparing carbon aerogels may be carried out at a temperature of approximately 600° C., 700° C., 800° C., 900° C., 1000° C., 1200° C. or higher than 1200° C. Particularly, the heat treatment may be carried out at a temperature of approximately 700° C., 800° C., 900° C. or 1000° C. The heating rate to reach the desired heat treatment temperature may be approximately 0.1° C., 0.5° C., 1° C., 5° C., 10° C., 20° C. or 50° C. per minute. Particularly, the heating rate may be approximately 0.5° C., 1° C., 5° C. or 10° C. per minute, and especially, 1° C., 2° C. or 5° C. per minute.

The carbon aerogels obtained from the above method have a specific surface area as large as approximately 700 $m^2/g$, 800 $m^2/g$, 900 $m^2/g$, 1,000 $m^2/g$, 1,100 $m^2/g$ or 1,200 $m^2/g$, and a capacitance as high as about 200 F/g, 250 F/g, 300 F/g, 350 F/g or 400 F/g. Therefore, the carbon aerogels obtained from the method according to one preferred embodiment disclosed herein may be used as electrode materials for supercapacitors, electrode materials for secondary batteries or electrochemical fuel cell systems, electrode materials for seawater or water purification in seawater desalination or deionization-based water purification processes, hydrogen or natural gas storage materials for energy storage systems, materials for treating contaminated water or waste water, catalyst carriers, or the like.

Reference will now be made in detail to example preferred embodiments. It is to be understood that the following examples are illustrative only.

Example 1

First, 1.6378 g of phloroglucinol is dissolved in 58.6 mL of ethanol. Next, nitric acid is added thereto in a molar ratio of 1/0.001 based on phloroglucinol, and the reaction mixture is sealed and agitated for 30 minutes at room temperature. Then, furfural is added in a molar ratio of 1/3 based on phloroglucinol, and the reaction mixture is sealed and agitated at room temperature to carry out a reaction. After gels are formed, agitation is terminated and the gels are aged at room temperature for 4 days. The aged gels are subjected to supercritical drying under 170 atm at 70° C. to form organic aerogels. Finally, the organic aerogels are heat treated in an electric furnace, through which helium flows, at a heating rate of 1° C./min to 800° C. so that the organic aerogels are converted into carbon aerogels.

Test Example 1

The capacitance of the carbon aerogels obtained from Example 1 is measured by using cyclic voltammetry. Cyclic voltammetry is a method capable of simply measuring electrochemical properties of carbon, metal-carbon and other electrode materials. A typical cyclic voltammetry system includes a tri-electrode electrochemical system comprising a reference electrode, a counter electrode and a working electrode, wherein aqueous sulfuric acid solution is used as an electrolyte. First, 0.008 g of the carbon aerogels and 25 wt % of Nafion based on the weight of the carbon aerogels are dispersed in isopropanol to form carbon ink. The carbon ink is coated onto the working electrode, followed by drying, and the working electrode is mounted to the electrochemical system to obtain a cyclic voltammogram. Next, the capacitance of the carbon aerogels is calculated from the area measured in the cyclic voltammogram. The analytical conditions used for such measurement are as follows: a sweep range of voltage of 0 V to 0.8 V based on the reference electrode, and a sweep rate of 20 mV/s.

Example 2

First, 1.6378 g of phloroglucinol is dissolved in 58.6 mL of ethanol. Next, furfural is added thereto in a molar ratio of 1/3 based on phloroglucinol. Then, the reaction mixture is sealed and agitated at room temperature to carry out a reaction. After gels are formed, agitation is terminated and the gels are aged at room temperature for 3 days. The aged gels are subjected to supercritical drying under 170 atm at 70° C. to form organic aerogels. Finally, the organic aerogels are heat treated in an electric furnace, through which helium flows, at a heating rate of 1° C./min to 800° C. so that the organic aerogels are converted into carbon aerogels.

Test Example 2

The capacitance of the carbon aerogels obtained from Example 2 is measured in the same manner as described in Test Example 1.

Example 3

First, 1.6378 g of phloroglucinol is dissolved in 58.6 mL of ethanol. Next, potassium hydroxide is added thereto in a molar ratio of 1/0.01 based on phloroglucinol. The reaction mixture is sealed and agitated at room temperature for 30 minutes. Then, furfural is added thereto in a molar ratio of 1/3 based on phloroglucinol, and the reaction mixture is sealed and agitated at room temperature to carry out a reaction. After gels are formed, agitation is terminated and the gels are aged at room temperature for 3 days. The aged gels are subjected to supercritical drying under 170 atm at 70° C. to form organic aerogels. Finally, the organic aerogels are heat treated in an electric furnace, through which helium flows, at a heating rate of 1° C./min to 800° C. so that the organic aerogels are converted into carbon aerogels.

Test Example 3

The capacitance of the carbon aerogels obtained from Example 3 is measured in the same manner as described in Test Example 1.

Example 4

First, 1.6378 g of phloroglucinol is dissolved in 58.6 mL of ethanol. Next, nitric acid is added thereto in a molar ratio of 1/0.001 based on phloroglucinol, and the reaction mixture is sealed and agitated at room temperature for 30 minutes. Then, furfural is added thereto in a molar ratio of 1/3 based on phloroglucinol, and the reaction mixture is sealed and agitated at room temperature to carry out a reaction. After gels are formed, agitation is terminated and the gels are aged at room temperature for 3 days. The aged gels are subjected to supercritical drying under 170 atm at 70° C. to form organic aerogels. Finally, the organic aerogels are heat treated in an electric furnace, through which helium flows, at a heating rate of 1° C./min to 800° C. so that the organic aerogels are converted into carbon aerogels.

Test Example 4

The capacitance of the carbon aerogels obtained from Example 4 is measured in the same manner as described in Test Example 1.

Example 5

First, 1.6378 g of phloroglucinol is dissolved in 58.6 mL of tent-butanol. Next, nitric acid is added thereto in a molar ratio of 1/0.001 based on phloroglucinol, and the reaction mixture is sealed and agitated at room temperature for 30 minutes. Then, furfural is added thereto in a molar ratio of 1/3 based on phloroglucinol, and the reaction mixture is sealed and agitated at room temperature to carry out a reaction. After gels are formed, agitation is terminated and the gels are aged at room temperature for 1 day. The aged gels are subjected to supercritical drying under 170 atm at 70° C. to form organic aerogels. Finally, the organic aerogels are heat treated in an electric furnace, through which helium flows, at a heating rate of 1° C./min to 800° C. so that the organic aerogels are converted into carbon aerogels.

Test Example 5

The capacitance of the carbon aerogels obtained from Example 5 is measured in the same manner as described in Test Example 1.

Example 6

First, 1.6378 g of phloroglucinol is dissolved in 58.6 mL of ethanol. Next, nitric acid is added thereto in a molar ratio of 1/0.1 based on phloroglucinol, and the reaction mixture is sealed and agitated at room temperature for 30 minutes. Then, formaldehyde is added thereto in a molar ratio of 1/3 based on phloroglucinol, and the reaction mixture is sealed and agitated at room temperature to carry out a reaction. After gels are formed, agitation is terminated and the gels are aged at room temperature for 3 days. The aged gels are subjected to supercritical drying under 170 atm at 70° C. to form organic aerogels. Finally, the organic aerogels are heat treated in an electric furnace, through which helium flows, at a heating rate of 1° C./min to 800° C. so that the organic aerogels are converted into carbon aerogels.

Test Example 6

The capacitance of the carbon aerogels obtained from Example 6 is measured in the same manner as described in Test Example 1.

Example 7

First, 1.1122 g of resorcinol is dissolved in 58.6 mL of ethanol. Next, nitric acid is added thereto in a molar ratio of 1/0.5 based on resorcinol, and the reaction mixture is sealed and agitated at room temperature for 30 minutes. Then, furfural is added thereto in a molar ratio of 1/2 based on resorcinol, and the reaction mixture is sealed and agitated at room temperature to carry out a reaction. After gels are formed, agitation is terminated and the gels are aged at room temperature for 3 days. The aged gels are subjected to supercritical drying under 170 atm at 70° C. to form organic aerogels. Finally, the organic aerogels are heat treated in an electric furnace, through which helium flows, at a heating rate of 1° C./min to 800° C. so that the organic aerogels are converted into carbon aerogels.

Test Example 7

The capacitance of the carbon aerogels obtained from Example 7 is measured in the same manner as described in Test Example 1.

The results of Test Examples 1 to 7 are shown in the following Table 1.

TABLE 1

|  | pH | Specific surface area (m$^2$/g) | Capacitance (F/g) |
| --- | --- | --- | --- |
| Ex. 1 | 2.5 | 1076 | 374 |
| Ex. 2 | 5.5 | 1038 | 291 |
| Ex. 3 | 10.0 | 1104 | 281 |
| Ex. 4 | 2.5 | 1021 | 287 |
| Ex. 5 | 2.5 | 930 | 359 |
| Ex. 6 | 1.0 | 796 | 405 |
| Ex. 7 | 1.0 | 820 | 237 |

Reference throughout this specification to "one embodiment," "an embodiment," "a preferred embodiment," "example embodiment" or similar language means that a particular feature, structure, or characteristic described in connection with the embodiment is included in at least one embodiment of the present invention. Thus, appearances of the phrases "in one embodiment." in an embodiment," "in a preferred embodiment," "in an example embodiment" and similar language throughout this specification may, but do not necessarily, all refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

While the present invention has been described in connection with certain exemplary or specific embodiments, it is to be understood that the invention is not limited to the disclosed embodiments, but, on the contrary, is intended to cover various modifications, alternatives, modifications and equivalent arrangements as will be apparent to those skilled in the art. Any such changes, modifications, alternatives, modifications, equivalents and the like may be made without departing from the principles, spirit and scope of the invention.

The invention claimed is:

1. A method for preparing carbon aerogels comprising: mixing phloroglucinol with furfural wherein the phloroglucinol and the furfural are mixed in a ratio of 1:3 to 1:2, and dissolving the resultant mixture in a solvent selected from a group consisting of primary alcohol, secondary alcohol, tertiary alcohol, acetone and tetrahydrofuran to form a sol solution wherein the phloroglucinol and the solvent are mixed in a ratio of 1:300 to 1:100, wherein the sol solution is gel at temperature of 20-30° C. under atmospheric pressure; substituting the solvent in thus obtained gels with liquid carbon dioxide, followed by drying in a supercritical state, to form aerogels; and heat treating thus obtained aerogels in an electric furnace under inert atmosphere at a temperature of at least 600° C. to obtain carbon aerogels having a specific surface area of 700 m$^2$/g to 1,200 m$^2$/g and a capacitance of 200 F/g to 400 F/g.

2. The method as claimed in claim 1 which further comprises adding an acidic or basic catalyst to the sol solution when forming the sol solution.

3. The method as claimed in claim 2 wherein the acidic catalyst is formic acid, acetic acid, phosphoric acid, nitric acid, hydrochloric acid or sulfuric acid, and the basic catalyst is aqueous ammonia, monoethanolamine, triethanolamine, potassium hydroxide, sodium hydroxide or sodium carbonate.

4. The method as claimed in claim 2 wherein the phloroglucinol and the catalyst are mixed in a ratio of 1:0.1 to 1:0.0001.

5. The method as claimed in claim 4 wherein the phloroglucinol and the catalyst are mixed in a ratio of 1:0.02 to 1:0.001.

6. The method as claimed in claim 2 wherein the heat treatment is carried out at a temperature of 700-1,000° C.

7. The method as claimed in claim 2 wherein a heating rate to reach the heat treatment temperature is 0.5° C./min to 10° C./min.

8. The method as claimed in claim 1 wherein the heat treatment is carried out at a temperature of 700-1,000° C.

9. The method as claimed in claim 1 wherein a heating rate to reach the heat treatment temperature is 0.5° C./min to 10° C./min.

10. The method as claimed in claim 9 wherein a heating rate to reach the heat treatment temperature is 1° C./min to 5° C./min.

* * * * *